INVENTORS:
Richard M. Bird
Ju C. Tu
By Joseph Dwyer
ATTORNEY

INVENTORS:
Richard M. Bird
Ju C. Tu
By Joseph A. Dwyer
ATTORNEY

MEMORY STORAGE SYSTEM

Filed Dec. 6, 1967 3 Sheets-Sheet 3

INVENTORS:
Richard M. Bird
Ju C. Tu

By Joseph R. Dwyer
ATTORNEY

3,553,651
MEMORY STORAGE SYSTEM

Richard M. Bird, Glendale, and Ju C. Tu, Sylmar, Calif., assignors to Singer-General Precision, Inc., a corporation of Delaware Filed Dec. 6, 1967, Ser. No. 688,443
Int. Cl. G11c 7/00
U.S. Cl. 340—172.5 6 Claims

ABSTRACT OF THE DISCLOSURE

A memory storage system is described in the following specification which is capable of storing a series of multibit binary data words, and of subsequently outputting the stored words on a first-in-first-out basis, or on a last-in-first-out basis.

BACKGROUND OF THE INVENTION

In a typical data processing system, it is often required that a series of data words be stored in memory and be subsequently produced from memory on either a first-in-first-out, or on a last-in-first-out basis. This sequence is usually achieved by suitable programming the data processor.

The present invention provides a simple and economically feasible memory system where the aforesaid functions may be achieved automatically and without the need for any particular program. A feature of the system of the invention is that the desired result is achieved with a minimum of components and associated circuitry.

Specifically, the system of the present invention provides a buffer storage type of memory which is capable of automatically storing data, and of then progressively producing the data by first selecting either the piece of data which has been in the storage the longest time, or by first selecting the piece of data which has been in the storage the shortest time.

DESCRIPTION OF THE ILLUSTRATED EMBODIMENTS

The various components shown in the systems of the illustrated embodiments are in themselves well known to the art, and are readily available. Therefore, a detailed explanation and circuit representation of the individual components in the present specification is deemed to be unnecessary.

The storage system of the present invention is intended to be used in conjunction with any known type of digital data processor. Typical data processors are described, for example, in the "Small Computer Handbook" 1966–1967 published by the Digital Equipment Corporation of Maynard, Massachusetts. Such data processors include, for example, a memory array which may, for example, be a core memory, and which has an associated memory address register. The data processor has the ability to issue commands to the memory as to whether the information is to be read into or read out of the memory, and it also has the ability of introducing a particular address into the memory address register, so that the information will be read into or derived from a particular memory location. It is also usual in such data processors to incorporate program counters which, for example, control the memory address registers which, themselves, are connected as binary counters, so that after each operation, the address register may be incremented to the next address to be treated in the memory. All the foregoing equipment is extremely well known in the prior art, and is described in the aforesaid handbook.

Figure 1:
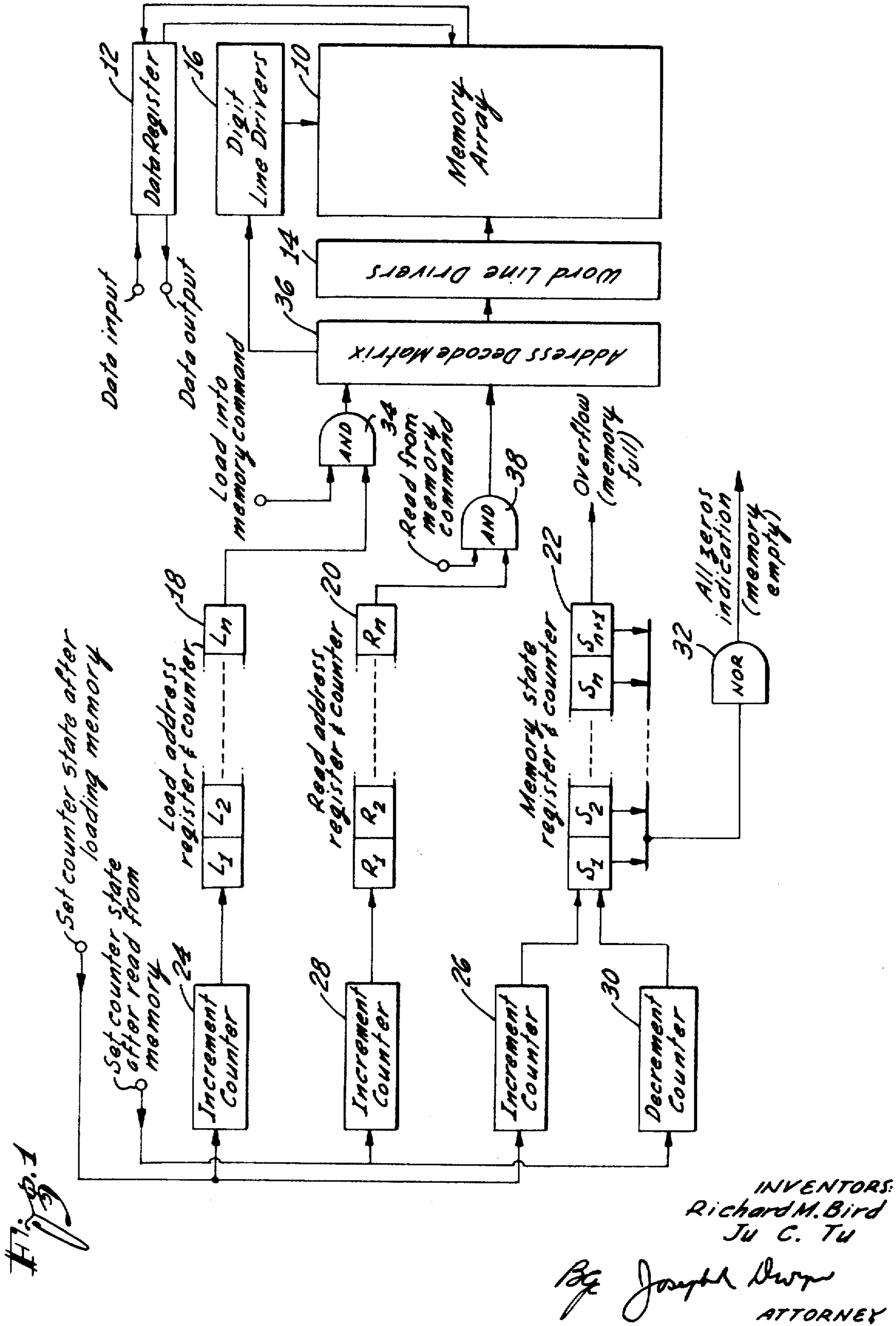
FIG. 1 is a block diagram of a memory storage system incorporating the concepts of the present invention, and which provides for the storage of a series of data words, and for the subsequent outputting of the data words on a first-in-first-out basis.

The storage system of FIG. 1 includes a memory array 10. This memory array may be of the well known coincident current type, or it may be a linear select array using plated wire; or any other appropriate known memory array may be used.

The memory 10 stores each multi-bit data word in a multi-digit line. A data word is first stored in a data register 12, and it is then loaded into its selected word line in the memory 10. The word can be loaded into the memory on a parallel or serial basis. The memory is stepped from line to line by usual word line drivers 14, and for serial loading it is stepped from bit to bit in each line by usual digit line drivers 16.

When data is to be input to the memory 10, a data word is first placed in the data register 12. The memory is then set to the addressed word line by the appropriate setting of the word line drivers 14. Then the data is stepped into the selected line on a serial basis, under the control of the digit line drivers 16, this being achieved by known memory control circuitry.

When a word is selected from the memory 10, the converse operation occurs, and the selected word is serially introduced into the data register 12.

A series of words may be read into the memory 10, or selected from the memory 10, by the operations described above. These operations, as indicated previously herein, are well known to the art.

For example, known types of data processors are programmed, so that in response to a "load memory" command, an appropriate address is placed in an address register associated with the memory array, so that the selected location of the memory is established, and the data previously fed into the associated data register is then fed into the selected memory location. Likewise, in response to a "read memory" command from the data processor, the converse occurs, and selected data is read out of the memory.

It is also usual in such data processors to provide an address register in conjunction with the aforesaid memory, and which is set to designate the selected memory location. This address register usually, in the prior art, takes the form of a binary counter, so that it may be set to any initial address by the data processor, and so that it may subsequently be counted from one address to the next by means of an associated increment counter. In this way, and in response to a single command from the data processor, a predetermined number of memory locations may be successively processed, under the incremental control of the associated address register. Many of such data processing systems, for example, are described in the aforesaid handbook.

In the practice of the present invention, and rather than having a single address register for use in conjunction with the loading into and reading from the memory, two separate address registers are provided, namely the load address register and counter 18, and the read address register and counter 20, only one of which is used during the loading operation, and the other of which is used during the reading operation. Therefore, the associated data processor in the execution of the "load memory" command, causes the "and" gate 34 to be enabled, whereas the "read" command from the data processor causes the "and" gate 38 to become enabled. However, in all other respects, the registers themselves, as well as their increment counters, are the same as those normally used in present-day data processors, the major difference being that two separate registers and increment counters are used in the storage system of the present invention.

During normal operation of the storage system, whenever the data processor causes a particular address to be read into the load address register and counter 18, the same address is read into the read address register and counter 20, in the embodiment of FIG. 1. Then, when the data processor signifies a read operation, the first address read out of the memory is the address previously placed in the read address register and counter 20, after which the counter is incremented by the increment counter 28, in the same way in which the load address register and counter 18 was incremented by the increment counter 24. However, insofar as the individual controls of the various counters are concerned, these are in all ways the same as in the usual data processing systems, such as described in the aforesaid handbook.

In order to maintain an accurate record of the number of increments during the load operation, the memory state register and counter 22 is used in the system of FIG. 1, and this register and counter is operated in exactly the same way as the registers 18 and 20. However, the latter register 22 is counted up during the load operation and is counted down during the read operation, all in accordance with usual and well known controls, and in accordance with well established binary counter and shift register principles.

As is extremely well known in the art, the memory state register and counter, as well as the register and counters 18 and 20, may be composed of bi-stable flip-flop circuits, and these circuits are triggered to various individual states, as the register and counter moves from one indication to the next. The flip-flops in any particular register, for example, are all set to zero when the counter is empty, and this setting of all the flip-flops in the counter 22, for example, enables the "nor" gate 32, so that an appropriate zero indication may be made to the data processor. The reason for this is to enable the data processor to know that the same number of addresses have been taken out of the memory as were originally put into the memory.

The system of FIG. 1 also includes a load address register and counter 18, a read address register and counter 20, and a memory state register and counter 22. These registers are well known to the art, and may be of the static type. That is, each register includes a series of flip-flops, the flip-flops being interconnected, so that the register can be stepped from one state to the next, as a binary counter.

An increment counter 24 is coupled to the load address register 18, and an increment counter 26 is coupled to the memory state register 22. The increment counters 24 and 26 respond to control signals from the associated data processor to set the load register 18 and memory state register 22 to a predetermined initial condition corresponding to a selected address in the memory 10.

Likewise, an increment counter 28 is coupled to the read address register 20, and a decrement counter 30 is coupled to the memory state register 22. The increment counter 28 and the decrement counter 30 also respond to control signals from the associated data processor to step the read address register, as will be described, and also to return the memory state register to its previous predetermined value on a step-by-step basis.

The load address register and counter 18, as indicated, is "$n$" bits in length, to correspond to $2^n$ word lines in the memory array 10. Likewise, the read address register 20 is "$n$" bits in length. The memory state register and counter 22, on the other hand, is "$n+1$" bits in length, the final bit providing an indication that the memory 10 is in a full condition. The memory state register 22 is also coupled to a logical "nor" gate 32 which provides an output when all the flip-flops in the memory state register 22 are in their reset state, to indicate that the memory 10 is empty. The "memory full" and "memory empty" indications are applied to the associated data processor.

The output from the load address register 18 is introduced to an "and" gate 34 which, in turn, is coupled to an address decode matrix network 36. A control signal from the data processor is also applied to the "and" gate 34, and the "and" gate is enabled in response to a "load into memory" command from the data processor. When the "and" gate 34 is enabled, the address decode matrix 36 produces an output corresponding to the setting of the load address register 18, so as to cause the memory 10 to be activated to the corresponding word line in the memory.

Likewise, the read address register 20 is coupled to an "and" gate 38 which, in turn, is also connected to the matrix network 36. Then, in response to a "read from memory" command from the data processor, the "and" gate 38 causes the matrix 36 to produce an output corresponding to the setting of the read address register 20. This, in turn, causes the word line drivers 14 to set the memory array 10 to the corresponding word line in the memory.

As mentioned above, the system of FIG. 1 is capable of storing data words in the memory 10. The data words are introduced successively into the data register 12, and they are then introduced to the memory 10 in successive word lines in the memory. The system of FIG. 1 is then subsequently capable of outputting the words from the memory 10 through the data register 12 on a first-in-first-out basis.

It is to be noted, that the memory array 10 has the capabilities of storing $2^n$ data words and, as noted, the load address register 18 is "$n$" bits in length, as it the read address register 20; whereas the memory state register 22 is "$n+1$" bits in length.

In the operation of the system of FIG. 1, initially the memory array 10 is empty. The load address register 18 and read address 20 are set to any value, as long as they are the same; and the memory state register 22 is set to zero. Therefore, the logical "nor" gate 32 produces an output, indicating to the data processor that the memory 10 is empty.

The first data word to be loaded into the memory 10 is placed in the data register 12, and it is read into the address indicated by the setting of the load address register and counter 18. After the first word has been read into the memory, the load address register 18 and the memory state register 22 are incremented, and the second word is read from the data register 12 into the memory 10. The logical "nor" gate 32 is now disabled, so that the memory 10 is no longer indicated as empty.

The aforesaid process continues, with data words being successively loaded into the memory 10, until the memory state register 22 reaches a state where it indicates that the memory is full. At that point, no more data can be read into the memory 10.

When data is to be read out of the memory 10, the "and" gate 38 is enabled by an appropriate command from the data processor. Also, the usual control circuitry associated with the memory 10 is controlled to introduce data from the selected address in the memory to the data register 12. It will be remembered that the read address register 20 was initially set to the same setting as the load address register 18. Therefore, at the beginning of the outputting operation, the word which was first introduced into the memory 10 is selected by the read address register. Then, the read address register 20 is incremented by the increment counter 28, and the memory state register 22 is decremented by the decrement counter 30, on a step-by-step basis. In this manner, the words in the memory 10 are successively read out of the system through the data register 12, and this output operation continues until the memory state register 22 causes the logical "nor" gate 32 to indicate that the memory is empty.

Figure 1A:
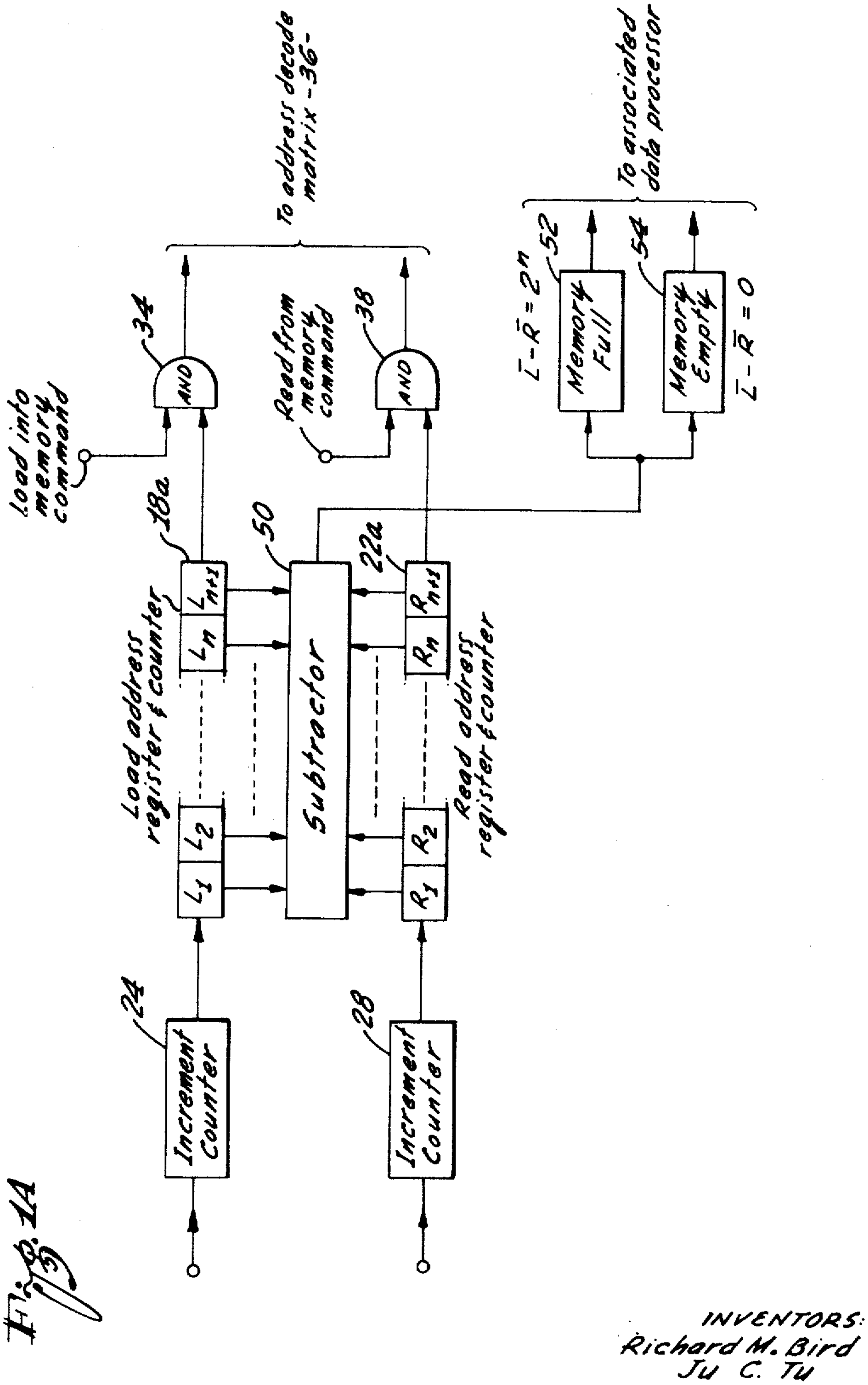
FIG. 1A is a block diagram showing the manner in which a portion of the system of FIG. 1 may be modified.

The diagram of FIG. 1A shows that the memory state register 22 may be replaced by a subtractor 50 which is coupled to a load address register 18*a* and to a read address register 22*a*. The subtractor 50 is capable of providing a "memory full" indication and a "memory empty" indication, which was the function of the memory state register 22 in the system of FIG. 1.

The subtractor 50 is coupled to a "memory full" circuit 52 which provides an output when $\bar{L}$-$\bar{R}=2^n$, and it is also coupled to a "memory empty" circuit which provides an indication when $\bar{L}$-$\bar{R}=0$.

It will be appreciated that in the system of FIG. 1A, one extra bit ($L_{n+1}$) is required in the load address register 18*a*, and one extra bit ($R_{n+1}$) is required in the read address register 22*a*. Both the systems of FIG. 1 and FIG. 1A operate equally as well, and the selection of one or the other system for any particular application would be dictated by relative component and circuit costs.

Figure 2:
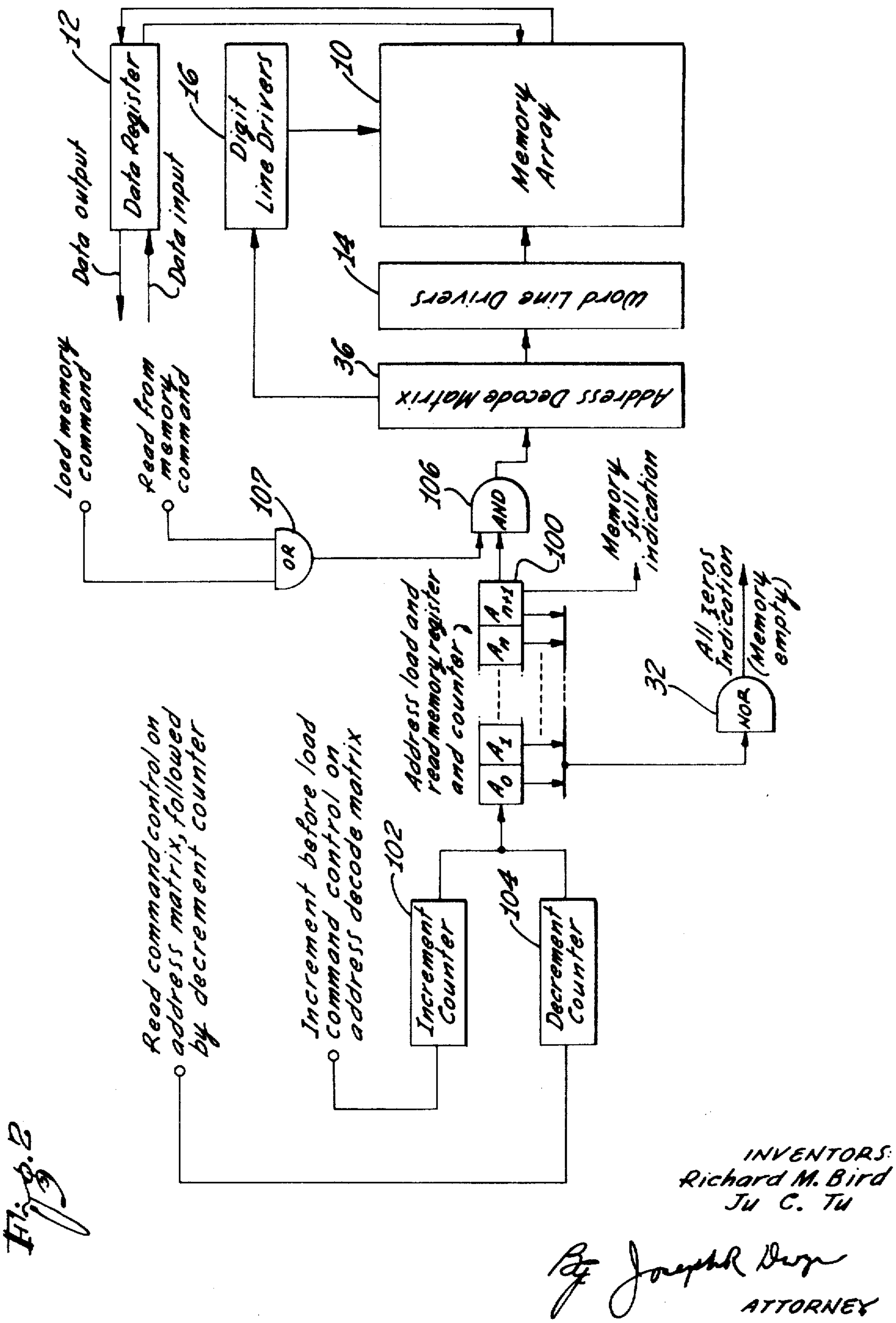
FIG. 2 is a block diagram of a memory storage which is controlled so that the data stored in the system may subsequently be produced on a last-in-first-out basis.

The system of FIG. 2 is generally similar to the system of FIG. 1, and like components have been designated by the same number. The system of FIG. 2, however, is somewhat simpler than the system of FIG. 1, and it requires less components. In the system of FIG. 2, a series of data words may be read into the memory 10, and these words subsequently may be outputted from the system on a last-in-first-out basis.

The system of FIG. 2 includes a single register and counter 100 which performs all the functions of the load address register 18, read address register 20 and memory state register 22 of the previous embodiment. The register 100 has "$n+1$" bits, as indicated.

An increment counter 102 is coupled to the register 100, and a decrement counter 104 is also coupled to the register. The output of the register 100 is coupled to an "and" gate 106 which, in turn, is coupled to the address decode matrix 36. An "or" gate 107 is also connected to the "and" gate 106.

The $A_{n+1}$ bit of the register 100 provides the "memory full" indication. The flip-flops of the register 100 are all connected to the "nor" gate 32 which, when enabled, provides a "memory empty" indication for the data processor. In the system of FIG. 2, initially the memory 10 is empty, and the address register 100 is set to zero. At this point, the "nor" gate 32 is enabled, so that a "memory empty" indication is provided for the data processor.

When the first piece of data is to be loaded into the memory 10, the corresponding data word is placed in the data register 12. The address register 100 is then incremented to the selected address in the memory 10 for the corresponding data word, this being achieved by the increment counter 102 in response to an "increment before load" command from the data processor. Then, the "load memory" command is applied to the "and" gate 106, through the "or" gate 107, so that the word in the data register 12 may be placed in the selected address in the memory 10.

However, always before loading any word into the memory 10, the "memory full" indication from the register 100 is checked, and when a "memory full" indication occurs, no more words may be loaded into the memory.

After the first word is loaded into the memory 10 from the data register 12, the second word appears in the data register, and the address register 100 is incremented by the counter 102, so that the subsequent word may be placed in the next address in the memory. This continues until the aforesaid "memory full" indication occurs.

When data is to be unloaded from the memory, the first word to be selected is indicated by the address of the address register 100, which corresponds to the last word read into the memory. The unloading takes place in receipt of the "read from memory" command from the data processor, which is passed through the "or" gate 107 to the "and" gate 106. This causes the last word to be read into the memory now to be introduced to the data register 12 and to be output from the system. Then, the "read command" control applied to the decrement counter 104 causes the address register 100 to step to its next state, so that the next word may be read out of the memory and into the data register 12. This action continues until the "nor" gate 32 indicates that the memory is empty.

The invention provides, therefore, a simple memory storage system which is suitable for buffer storage purposes, and which is capable of providing the words input into the memory either on a first-in-first-out or on a last-in-first-out basis. It is apparent that the systems of FIGS. 1 and 2 can be combined by suitable logic circuitry, so as to provide a composite system capable of either of the operations.

While particular embodiments of the invention have been shown and described, modifications may be made. It is intended in the claims to cover the modifications which come within the scope of the invention.

What is claimed is:

1. A data storage system for receiving and storing a series of multi-bit binary words and for subsequently outputting the said words in a predetermined sequence, said system including: a memory array for storing a predetermined number of said multi-bit binary words; means for introducing a series of multi-bit binary data words into said memory array; means for subsequently selecting the multi-bit binary data words of said series from said memory array; first position-determining means coupled to said memory to determine the position in said memory at which said data words are to be stored; second position-determining means coupled to said memory to determine the position in said memory from which said data words are to be selected; means for setting the initial state of both said first and second position-determining means to a predetermined value corresponding to a selected address in said memory array first increment counter means coupled to said first position-determining means for changing the state of said first position-determining means on a step-by-step basis; and second increment counter means coupled to said second position-determining means for subsequently changing the state of said second position-determining means on a step-by-step basis.

2. The data storage system defined in claim 1, and which includes means coupled to both said first and second position-determining means for indicating a memory full condition and for indicating a memory empty condition.

3. The storage system defined in claim 1, in which said first position-determining means includes a load address register and counter, and said second position-determining means includes a read address register and counter.

4. The data storage system defined in claim 3, and which includes a memory state register and counter, increment counter means coupled to said memory state register and counter, and decrement counter means coupled to said memory state register and counter; first means coupled to said memory state register and counter to indicate a memory full condition, and second means coupled to said memory state register and counter to indicate a memory empty condition.

5. The data storage system defined in claim 3, and which includes a subtractor network coupled to said load address register and counter and to said read address register and counter; first means coupled to said subtractor network to indicate a memory full condition, and second means coupled to said subtractor network to indicate a memory empty condition.

6. The data storage system defined in claim 1, in which said first and second position-determining means include a common address register and counter, in which said first and second increment counter means are both coupled to said common register and counter, and in which said second increment counter is coupled to said common address register and counter for subsequently returning said common address register to its initial state on a step-by-step basis.

References Cited

UNITED STATES PATENTS

| | | | |
|---|---|---|---|
| 3,047,228 | 7/1962 | Bauer et al. | 235—157 |
| 3,234,524 | 2/1966 | Roth | 340—172.5 |
| 3,351,917 | 11/1967 | Shimabukuro | 340—172.5 |
| 3,396,371 | 8/1968 | Waldecker | 340—172.5 |
| 3,441,908 | 4/1969 | Mizzi | 340—172.5 |
| 3,444,526 | 5/1969 | Fletcher | 340—172.5 |

PAUL J. HENON, Primary Examiner

R. F. CHAPURAN, Assistant Examiner